Sept. 15, 1970   K. M. BAIRD   3,528,206
THERMAL EXPANSION COMPENSATION DEVICE
Filed July 16, 1968   3 Sheets-Sheet 1

INVENTOR
KENNETH M. BAIRD
By J. R. Hughes
AGENT

United States Patent Office 3,528,206
Patented Sept. 15, 1970

3,528,206
THERMAL EXPANSION COMPENSATION DEVICE
Kenneth M. Baird, Ottawa, Ontario, Canada, assignor to Canadian Patents and Development Limited, Ottawa, Ontario, Canada, a corporation of Canada
Filed July 16, 1968, Ser. No. 745,187
Claims priority, application Canada, Aug. 3, 1967, 997,017
Int. Cl. E04c 3/00
U.S. Cl. 52—1                    8 Claims

ABSTRACT OF THE DISCLOSURE

A thermal expansion compensation device formed by placing in contact with the solid structure whose thermal expansion effects are to be compensated for in a chosen direction, a second structure of solid material that will on change of temperature compress or expand, by means of its thermal expansion or contraction, the first solid structure generally at right angles to the said chosen direction, the coefficient of thermal expansion of the second structure being such as to cause the first structure to undergo a length change in the chosen direction sufficient to compensate for or neutralize the normal thermal expansion or contraction in that direction.

---

This invention relates to a thermal expansion compensation device and more particularly to a structure capable of maintaining two points or planes in precise fixed spaced relation irrespective of temperature changes.

The thermal expansion coefficient of the metal alloy Invar (approximately $10^{-6}/°C.$) is low enough for most applications requiring a high degree of temperature stability. There are several applications and these have increased in recent years where the requirements are so stringent that it is necessary to reduce or control the effects of temperature changes even in Invar. One such application is the mounting and positioning of the end mirrors in lasers especially the gaseous type. Thermostatting and feedback control systems have been devised but these are complex, cumbersome, and expensive. There are other applications where it would be highly desirable for a rod or tub or similar structures to have zero or very low thermal expansion. For example, in nuclear reactor construction it would be highly desirable to have tubes made of materials selected because of their physical and nuclear characteristics but which has zero or low thermal expansion.

It is an object of the present invention to provide a structure that has zero or low thermal expansion in a selected direction.

It is another object of the invention to provide an apparatus or structure for maintaining two points or planes in a structure in precise, fixed or pre-determined spatial relationship.

It is another object of the invention to provide a simple, rugged, inexpensive means for neutralizing or compensating for thermal expansion effects in solid structural materials such as glass, quartz, steel, brass, nickel and other metals including Invar an iron-nickel alloy which already has a very low coefficient of thermal expansion.

These and other objects of the invention are achieved by placing in contact with the solid structure whose thermal expansion effects are to be compensated for in a chosen direction, a second structure of solid material that will on change of temperature compress or expand, by means of its thermal expansion or contraction, the first solid structure generally at right angles to the said chosen direction, the coefficient of thermal expansion of the second structure being such as to cause the first structure to undergo a length change in the chosen direction sufficient to compensate for or neutralize the normal thermal expansion or contraction in that direction.

Operation of the invention is based on the principle that if a material is stretched or compressed in one direction, it will undergo a length change of opposite sign in directions at right angles, or magnitude about one third as great. The ratio of this change is known as Poisson's ratio and of course is different for different materials. Thus, if a temperature change is made to produce a compression or extension in a structure at right angles to the direction in which the structure is desired to be stabilized, compensation can be effected by suitable choice of constants and dimensions.

In drawings which illustrate an embodiment of the invention,

Figure 1:
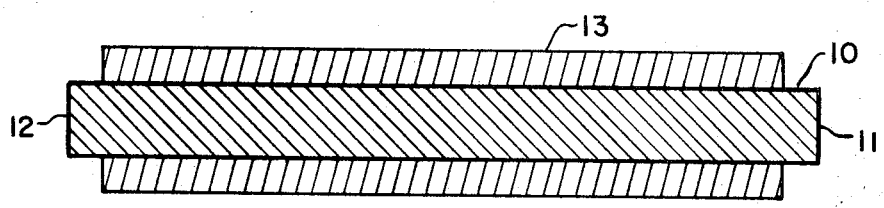
FIG. 1 shows in cross-section a simple form of compensated device.

Referring to FIG. 1, a solid metal cylindrical rod 10 has end faces 11 and 12. It is desired to stabilize the long dimension of the rod or in other words maintain the two end faces in fixed spatial or dimensional relationship, i.e., with zero thermal expansion. An annular tight-fitting outer metallic casing is shrunk-fit onto rod 10 effectively squeezing or compressing rod 10. The coefficient of thermal expansion of the material in the casing is chosen such that with an increase of ambient temperature with resulting increase in length of rod 10 due to its normal thermal expansion, casing 13 will also expand outwardly removing some of the radial compressive force on rod 10 with the result that there is a shortening of rod 10 due to the Poisson's ratio effect of sufficient amount to compensate for its normal thermal expansion. On a decrease of ambient temperature, the reverse action takes place with end faces 11 and 12 being maintained a fixed distance apart. It will be realized that casing 13 is shrunk onto rod 10 to give a compressive bias such that the device will be operative with changes of temperature both positive and negative over the expected working range.

The device of FIG. 1 is operative in principle but suffers from two drawbacks. First, it is possible but difficult to select the correct dimensions (cross-sections) and constants (thermal expansion coefficients) for precise compensation. Secondly, annular tube or housing 13 would expand or contract longitudinally as well as radially and as its inner surface is in relatively intimate contact along its length with the outer surface of rod 10, there would be a tendency to drag or pull rod 10 with it imparting an undesirable and unpredictable length change. These drawbacks of the device of FIG. 1 can be overcome by a structure as illustrated in FIG. 2.

Figure 2:
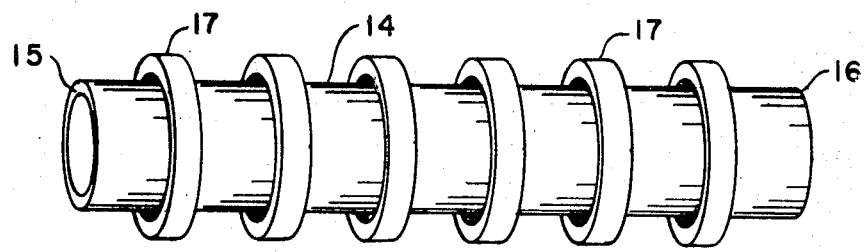
FIG. 2 shows another and more practical form of compensated device.

In FIG. 2, a tube 14 has ends 15 and 16 which could be readily adapted to have mounted therein mechanical or optical elements that require precise dimensional stability, i.e., zero thermal expansion. These elements could be typically the end mirrors of a laser or etalon and the tubular structure of the device of FIG. 2 lends itself admirably to this application. Mounted by shrink-fitting on tube 14 are a series of thin rings 17. In a device that has been built and tested for the stabilization of laser end mirror, tube 14 was of Invar and encircling rings were of nickel-steel. The thermal expansion coefficient of nickel-steel is large ($19 \times 10^{-6}/°C.$) compared to that of Invar (approx. $10^{-6}/°$ C.). The ratio of the cross-sectional areas of the rings to that of the Invar tube was about 1:6 which would cause a circumferential compression of the tube of ⅙ as much with a resulting lengthening of the tube of about ⅓ of this. Thus, there will be a $⅓ \times ⅙ (19-1) \times 10^{-6} = 1 \times 10^{-6}/°$ C. extension which serves to compensate for the $10^{-6}/°$ C. normal expansion of the Invar tube. A great advantage of this form of device is that the material, dimensions, and constants of the rings can be readily chosen to a first degree of precision of operation after which the device can be tested by optical or other means, with the outer rims of the rings shaved or machined down to bring the device to a very precise order of operation. The device would be set up initially to overcompensate, and the removal of material from the rings would then achieve the necessary accuracy of operation.

Figure 3:
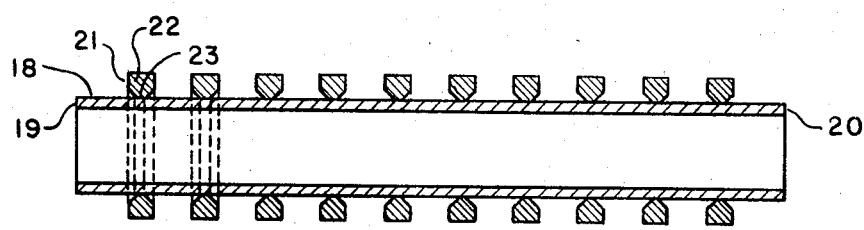
FIG. 3 shows a modified form of the device of FIG. 2.

FIG. 3 illustrates another form of the device wherein tube 18 having ends 19 and 20 are encircled by a series of tight fitting rings 21 having a cross-section 22 of such shape as to give a small contact area 23 in relation to the cross-section area. This construction greatly reduces or eliminates the longitudinal dragging effect the rings might have on the tube 18.

Figure 4:
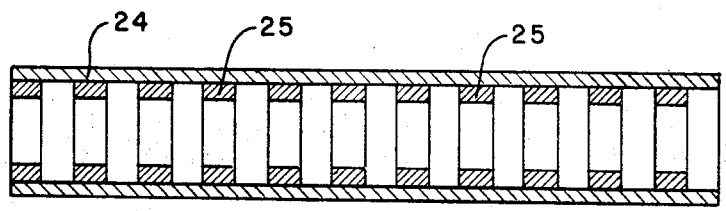
FIG. 4 shows an inverted form of the device of FIG. 2.

FIG. 4 is a form of structure wherein the rings 25 are placed inside tube 24 and bear outwardly against it. On an increase in temperature, for example, tube 24 would lengthen due to its normal thermal expansion. At this same time rings 24 would expand imparting an increased circumferential tension (expansion) to tube 24. This in turn results in a longitudinal contraction to the tube which if arranged to be the correct amount would exactly compensate for the normal expansion. In a decrease of temperature the reverse action takes place. An advantage of this form of construction is that the rings which would normally have the higher coefficient of thermal expansion are inside the tube and not directly affected by air currents, draughts, etc. which would tend to cause undesired temperature changes.

Figure 5:
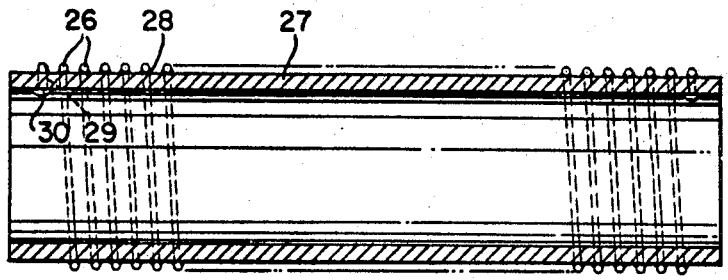
FIG. 5 shows a compensating structure in the form of a helix.

The annular rings of FIGS. 2 and 3 are very satisfactory but could be replaced with a helical structure. FIG. 5 shows a version of the device in which the compensating structure is in the form of a helix and more particularly, a helical wire 26 wrapped around tube 27 over its length. To hold the wire in position it may be attached to the tube surface by a small amount of solder 28. The ends of the wire may be fixed by various means. As illustrated the wire is brought through an opening 29 with a head or bur 30 formed on the end sufficient to hold it. The size and material of the wire would be chosen to provide the necessary temperature compensation. It will be realized that this is difficult to do completely from a theoretical point of view and empirical methods would have to be resorted to.

In the above discussion, the invention has been described in terms of Invar with nickel-steel as the compensating ring material. The invention of course would apply quite readily to structures of other material, e.g., steel, iron, nickel-steel, brass, copper, etc. and also to many non-metallic solid materials such as glass and quartz. It will also be realized that the apparatus may be designed to overcompensate e.g. decrease in length on a temperature rise and there may be applications where this characteristic would be valuable.

What is claimed is:

1. A thermal expansion compensated structure comprising a first member of a solid material in the form of an elongated rod with a first coefficient of thermal expansion and elongated in a direction in which compensation is desired and a second member of solid material in the form of an annular casing mounted on and encircling said first member with a second coefficient of thermal expansion in compressive contact with the first member generally at right angles to the stated direction such that on changes of ambient temperature there will be changes in the pressure exerted on the first member with the coefficient of thermal expansion of the second member being such that the pressure changes brought about on temperature changes will cause the first member to alter in length in the stated direction an amount sufficient and in the correct sense to compensate for the normal thermal expansion of the said member in that direction.

2. A thermal expansion compensated structure comprising a first member of a solid material in the form of an elongated rod with a first coefficient of thermal expansion and elongated in a direction in which compensation is desired and a second member in the form of series of annular disc-shaped rings encircling said rod at spaced intervals with a second coefficient of thermal expansion in compressive contact with the first member generally at right angles to the stated direction such that on changes of ambient temperature there will be changes in the pressure exerted on the first member with the coefficient of thermal expansion of the second member being such that the pressure changes brought about on temperature changes will cause the first member to alter in length in the stated direction an amount sufficient and in the correct sense to compensate for the normal thermal expansion of the said member in that direction.

3. A thermal expansion compensated structure as in claim 2 wherein the series of rings make minimal contact with the surface of the rod to minimize the dragging effect on the said rod in the stated direction.

4. A thermal expansion compensated structure comprising a first member of a solid material in the form of an elongated tube with a first coefficient of thermal expansion and elongated in a direction in which the compensation is desired and a second member in the form or series of annular disc-shaped rings encircling said tube at spaced intervals with a second coefficient of thermal expansion in compressive contact with the first member generally at right angles to the stated direction such that on changes of ambient temperature there will be changes in the pressure exerted on the first member with the coefficient of thermal expansion of the second member being such that the pressure changes brought about on temperature changes will cause the first member to alter in length in the stated direction an amount sufficient and in the correct sense to compensate for the normal thermal expansion of the said member in that direction.

5. A thermal expansion compensated structure as in claim 4 wherein the series of rings makes minimal contact with the surface of the tube to minimize the dragging effect on the said tube in the stated direction.

6. A thermal expansion compensated structure comprising a first member of solid material in the form of an elongated tube with a first coefficient of thermal expansion and elongated in a direction in which compensation is desired and a second member in the form of a series of rings mounted inside said tube at spaced intervals along its length with a second coefficient of thermal expansion in compressive contact with the first member generally at right angles to the stated direction such that on changes of ambient temperature there will be changes in the pressure exerted on the first member with the coefficient of thermal expansion of the second member being such that the pressure changes brought about on temperature changes will cause the first member to alter in length in the stated direction an amount sufficient and in the correct sense to compensate for the normal thermal expansion of the said member in that direction.

7. A thermal expansion compensated structure comprising a first member of solid material in the form of an elongated tube with a first coefficient of thermal expansion and elongated in a direction in which compensation is desired and a second member in the form of a helix encircling said first member with a second coefficient of thermal expansion in compressive contact with the first member generally at right angles to the stated direction such that on changes of ambient temperature there will be changes in the pressure exerted on the first member with the coefficient of thermal expansion of the second member being such that the pressure changes brought about on temperature changes will cause the first member to alter in length in the stated direction an amount sufficient and in the correct sense to compensate for the normal thermal expansion of the said member in that direction.

8. A thermal expansion compensated structure as in claim 7 wherein the helix is a metal wire tightly wrapped around the first member and having its ends fixed thereto.

References Cited

UNITED STATES PATENTS

| | | | |
|---|---|---|---|
| 2,660,049 | 11/1953 | Maney | 52—224 |
| 3,049,194 | 8/1962 | Brendel | 52—1 |
| 3,077,958 | 2/1963 | Grimsey | 52—573 X |
| 3,201,076 | 8/1965 | Deleyze | 52—573 X |
| 3,203,141 | 8/1965 | Musser | 52—1 |
| 3,229,224 | 1/1966 | Waly et al. | 331—94.5 |

PRICE C. FAW, JR., Primary Examiner

U.S. Cl. X.R.

33—168; 52—573; 331—94.5